United States Patent [19]
Heuer

[11] Patent Number: 6,049,284
[45] Date of Patent: *Apr. 11, 2000

[54] METHOD AND ZERO-SPEED MONITOR FOR MONITORING A THREE-PHASE MACHINE

[75] Inventor: Friedhelm Heuer, Oldendorf, Germany

[73] Assignee: K. A. Schmersal GmbH & Co., Wuppertal, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/923,041

[22] Filed: Sep. 3, 1997

[30] Foreign Application Priority Data

Sep. 3, 1996 [DE] Germany ............... 196 35 701

[51] Int. Cl.$^7$ ................................. G08B 21/00
[52] U.S. Cl. .................... 340/648; 318/671; 318/768; 318/780
[58] Field of Search ............... 340/635, 648; 318/639, 671, 34, 768, 780

[56] References Cited

U.S. PATENT DOCUMENTS

| | | | |
|---|---|---|---|
| 5,151,642 | 9/1992 | Lombardi et al. | 318/779 |
| 5,300,870 | 4/1994 | Smith | 318/768 |
| 5,488,281 | 1/1996 | Unsworth et al. | 318/806 |
| 5,767,639 | 6/1998 | Sakaguchi et al. | 318/254 |

FOREIGN PATENT DOCUMENTS

38 37 218  10/1991  Germany .

*Primary Examiner*—Edward Lefkowitz
*Attorney, Agent, or Firm*—Alix, Yale & Ristas, LLP

[57] ABSTRACT

A method and apparatus for monitoring a three-phase electric motor which has been disconnected from the electrical mains and is running down, one phase of the voltage generated by the motor being checked respectively in each of two channels for zero crossings and, if a zero crossing occurs, a signal being produced which, after DC-decoupling, is used to control the operation of a safety device. The safety devices are mutually interlocked and control signals therefor are produced only when the period between zero-crossings detected in both channels indicates that the motor output shaft has ceased rotation.

20 Claims, 2 Drawing Sheets

US 6,049,284

METHOD AND ZERO-SPEED MONITOR FOR MONITORING A THREE-PHASE MACHINE

BACKGROUND OF THE INVENTION

1. Field of the Invention

The present invention relates to monitoring the rotational speed of the output shaft of an electric motor and, particularly, to the provision of an indication that the load driven by a three-phase machine has reached a stand-still state subsequent to interruption of the current supply to the machine. More specifically, this invention is directed to a monitor which electronically determines when the rotor of a three-phase electrical motor, which has been disconnected from its power supply, has reached a stand-still state. Accordingly, the general objects of the present invention are to provide novel and improved methods and apparatus of such character.

2. Description of the Prior Art

While not limited thereto in its utility, the present invention is particularly well-suited for employment with machine tools. The moving parts of such tools are frequently driven by three-phase electrical motors. These moving parts, which may rotate, reciprocate and/or comprise components of robotic production lines, constitute hazards to personnel when in operation. Accordingly, machine tools or the workpiece manipulating components thereof are frequently located in an area which is protected by guards or the like, i.e., access to the moving parts is via protective doors. Such doors, or other safety related devices, are controlled in such a manner that they cannot be opened and/or cannot be operated until the associated machine has come to rest. As a consequence of inertia and kinetic energy, the rest condition does not occur until some time after the electrical power supply to the drive motor has been interrupted.

An electric motor will, upon being disconnected from its power source, function as a generator during the time the rotor slows down from the operating speed to a stand-still condition. The zero-speed monitoring of the output shaft of electric motors has conventionally been accomplished by comparing the voltage generated by the machines with a reference voltage level, the machine being assumed to be at rest if the latter is undershot. This reference voltage level, however, must be set and it is, accordingly, possible that either the setting will be incorrect or will accidentally be changed. If the reference voltage level is incorrect, there is a potential safety hazard.

SUMMARY OF THE INVENTION

The present invention overcomes the above briefly-discussed problem and, in so doing, provides a novel and improved method for monitoring the speed of the output shaft of a three-phase electrical motor which has been disconnected from its power supply and, particularly, for providing an indication that the rotor of the motor has ceased to rotate. The invention also encompasses novel monitoring apparatus for use in determining the zero-speed condition of a three-phase machine and, particularly, a monitor which does not require the setting of a reference voltage level for comparison with the actual voltage generated by the machine being monitored.

In accordance with the present invention, signals commensurate with the zero-crossings of the voltage generated by a three-phase electric motor which has been disconnected from its power supply are produced and the absence of such signals is employed to confirm that the rotor of the machine is stationary. Accordingly, the zero-speed monitoring of the machine is not susceptible to external influence. Also, the safety of the monitoring technique of the invention is optimized since the detection of the zero-crossings of the generated voltage may also be employed to carry out a self-test on the zero-speed monitor.

BRIEF DESCRIPTION OF THE DRAWINGS

The present invention may be better understood, and its numerous objects and advantages will become apparent to those skilled in the art, by reference to the accompanying drawings wherein like reference numerals refer to like elements in the Figures and in which.

DESCRIPTION OF THE DISCLOSED EMBODIMENT

Figure 1:
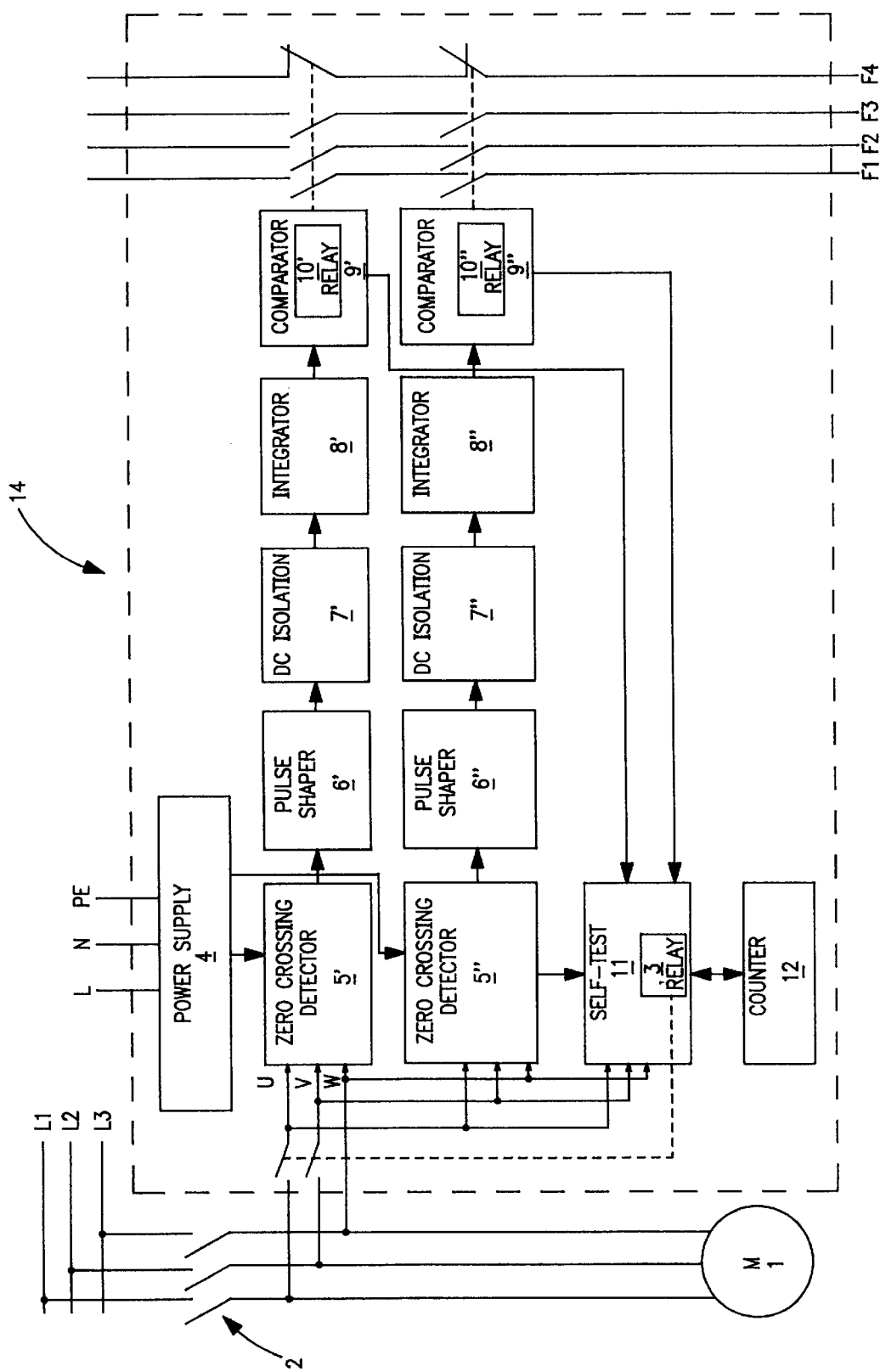
FIG. 1 is a circuit block diagram which depicts a monitor in accordance with the invention.

With reference simultaneously to both Figures of the drawing, a three-phase electric motor which has its output shaft operatively connected to a load, for example a machine tool, is indicated at 1. Motor 1 is connected to, and derives operating power from, a three-phase alternating current source represented by conductors L1, L2 and L3. The application of power from the AC source to the power supply terminals of motor 1 is controlled by a main on/off switch 2. A monitor in accordance with the present invention, indicated generally at 14 in FIG. 1, is connected in parallel with motor 1 on the load side of switch 2. In the disclosed embodiment, two of the three power supply conductors for motor 1 are respectively connected to inputs U and V of monitor 14 via contacts of a relay 3.

In the manner to be described below, monitor 14 provides one or more safety related command signals. In the disclosed embodiment, these command signals are caused to appear on four "release lines", indicated at F1, F2, F3 and F4, by means of changing the state of relay contacts connected in series with the release lines. For purposes of illustration, three of the release lines are provided with two pair of series connected normally open contacts while the fourth release line is illustrated as employing two pair of series connected, normally closed contacts. The release lines F1–F4 are connected to operators for protective door locks or to other safety-relevant devices.

Zero-speed monitor 14 comprises a power supply 4 which is connected, via conductors L, N and FE, to a power source such as, for example, the AC electrical mains of a building in which the machine tool driven by motor 1 is located. Thus, typically, power supply 4 will be connected across a single phase low voltage AC source and conductor PE will be a protective, i.e., grounded, conductor. Power supply 4 will convert the applied AC voltage into the DC voltages which are required for operation of monitor 14.

Figure 2:
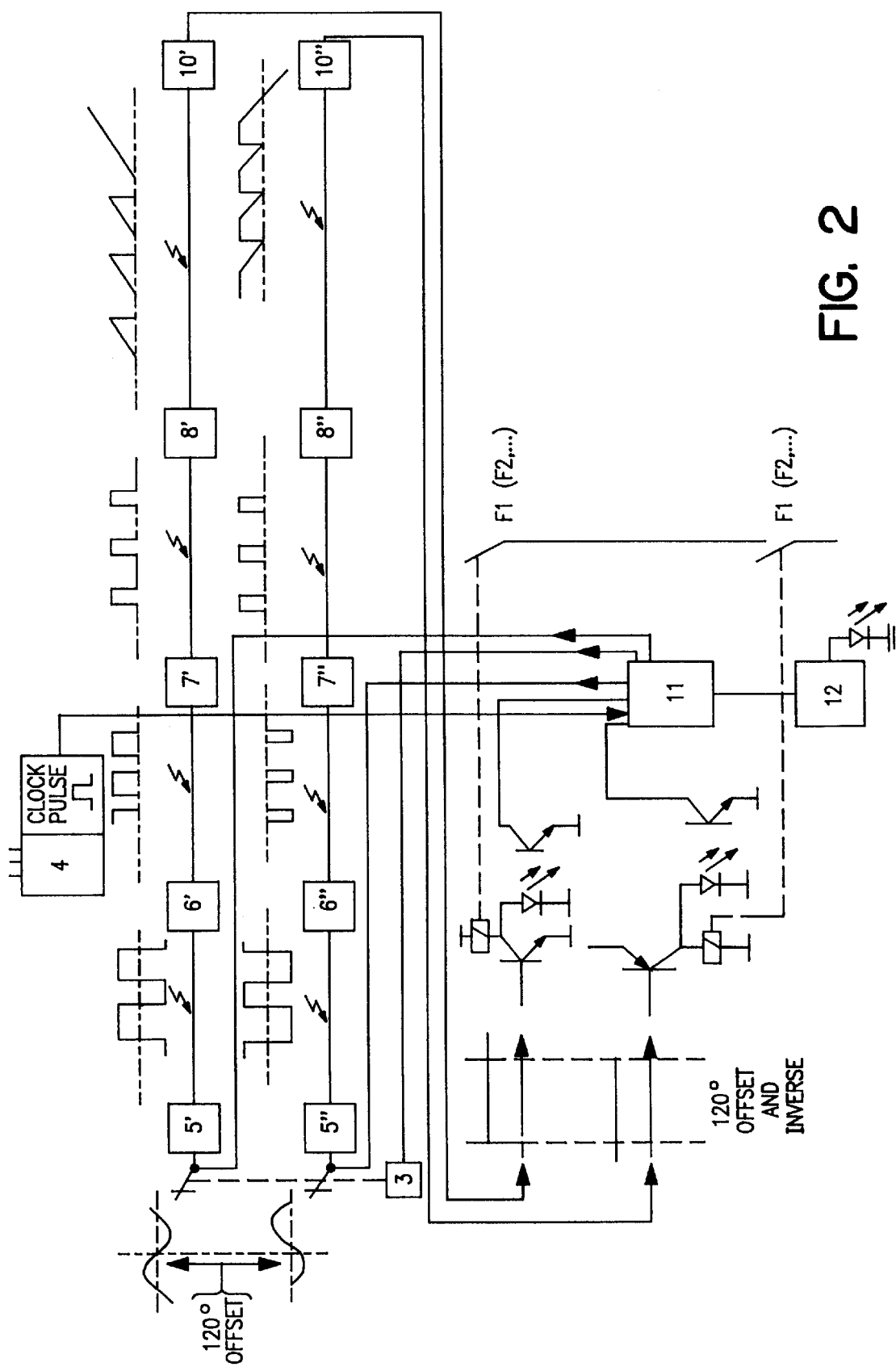
FIG. 2 is a circuit block diagram similar to FIG. 1 but with voltage waveforms superimposed thereon in the interest of facilitating understanding of the invention.

As schematically illustrated in FIG. 2, power supply 4 will include a clock pulse generator. The clock signal, which will preferably be a square wave having a frequency in the range of 2 to 5 kHz, is delivered via high-value resistors (not illustrated) to inputs U and V of monitor 14. If the three-phase machine 1 is connected correctly and is fault-free, and presuming the contacts of relay 3 to be in the closed condition, the low impedance windings of motor 1 will act as shunts for the clock signal. Accordingly, under normal operating conditions, the monitor 14 will not "evaluate" the clock signals.

In the event of a fault, for example if one of the power supply connections to motor 1 is broken, the clock signal would no longer be effectively short-circuited. Under such circumstances, the zero-speed monitor will identify the clock signal as the rotating field frequency of a motor and, in the manner to be described below, will prevent production of a command signal. When the contacts of relay 3 are in the open state as depicted in FIG. 1, accordingly, the pulses provided by the clock generator may be used for test purposes, i.e., for testing of monitor 14 when the three-phase machine is at rest.

Zero-speed monitor 14 comprises a pair of redundant channels. Each channel has a pair of inputs connected via contacts of relay 3 to power supply terminals of motor 1. The input indicated at W will, of course, provide a reference potential. Thus, a first AC voltage may be measured between inputs U and W and a second AC voltage, which is 120° out-of-phase with the first voltage, may be measured between inputs V and W. Each of the parallel channels of monitor 14 comprises a zero-crossing detector, indicated at 5' and 5", a pulse shaping circuit, indicated at 6' and 6", a DC isolation circuit, indicated at 7' and 7", an integrator circuit, indicated at 8' and 8" and an evaluation circuit comprising a comparator/relay, indicated at 9', 10' and 9", 10".

During normal operation, with motor 1 connected to the power supply L1, L2 and L3 by switch 2, input signals commensurate with the high potential three-phase power supply voltage are applied in parallel to each channel of monitor 14 via high value resistors which provide requisite protection. In the manner to be described below, the input signals to monitor 14 will be evaluated and will prevent a change of state of the contacts of the relays 10', 10" connected in series in the release lines F1–F4. When switch 2 is opened, due to the effects of inertia and the kinetic energy stored in motor 1 and its load, the motor will generate an AC voltage at a frequency which decreases as the motor output shaft slows down.

Voltages appearing across input terminals U, V, W of monitor 14, i.e., either the three-phase motor power supply voltage or a voltage generated by the motor itself during slow-down, are converted by the zero-crossing detectors 5' and 5" into trains of substantially square-wave pulses. The repetition rate of these square-wave pulses, at least during the slow-down, will be proportional to the rotational speed of the motor. The square-wave signals generated by the zero-crossing detectors are delivered to respective pulse-shaping circuits 6', 6". The pulse shaping circuits convert the output signals of the zero-crossing detectors, which have variable pulse lengths, into pulse trains wherein the width of the pulses is constant and, for low rotational speeds of the motor, the pulse repetition rate is proportional to rotational speed. The pulse trains from the pulse shaping circuits 6', 6" are DC isolated from the AC source voltage by circuits 7', 7" which, by way of example, may be optocouplers.

As may be seen from the voltage waveform diagrams appearing on FIG. 2, the pulse shaping circuits 6', 6" are expediently of complementary construction, i.e., the pulse shapers preferably provide opposite polarity signals. In the disclosed embodiment, pulse shaper 6' provides an output signal which varies between +Ub and ground potential while pulse shaper 6" provides an output signal which varies between –Ub and ground. This enables the operating voltage supplied by power supply 4 to be monitored since the DC isolating stages 7', 7" will supply current when there are no applied pulses, and it is not possible for pulses to be transmitted in the event of supply voltage failure.

The DC isolated pulse trains which appear at the outputs of isolation circuits 7' and 7" are applied as inputs to respective integrators 8' and 8". Each applied pulse will, in the manner known in the art, cause the resetting of the associated integrator and, accordingly, the maximum level (positive or negative) of the voltage appearing at the outputs of the integration circuits will be a function of the repetition rate, i.e., the frequency, of the applied pulses. This relationship is shown on FIG. 2. The threshold voltages of the comparators of the evaluation circuits 9', 10' and 9", 10" are selected such that the state of the switching devices 10', 10" will be caused to change only when the integrators "overflow" commensurate with the standstill condition of the motor 1. Since the two channels of monitor 14 preferably function in an inverse manner, i.e., the channels effectively process signals of opposite polarity, any errors which may occur, errors commensurate with transients for example, will not affect both channels in the same way.

The integrators 8', 8", like the pulse shaping circuits 6', 6", are preferably of complementary construction. In the interest of equalizing the thresholds of the evaluation circuit comparators, one of the integrators can be made adjustable so that internal trimming can be accomplished.

As noted above, the contacts of the relays 10', 10" of the evaluation circuits are connected in series. Accordingly, command signals will be provided on the release lines F1–F4 only if switching signals are synchronously present to cause operation of both of relays 10', 10". A three-phase motor 1 having a rotor which is turning cannot supply such signals, i.e., the voltages provided by the zero-crossing detectors 5', 5" are necessarily offset by approximately 120°. By way of contrast, when the rotor of motor 1 comes to rest, no zero crossings will be detected and no input pulses will be delivered to the integrators 8', 8". Accordingly, the integrators "run on", i.e., overflow, and the downstream comparators 9', 9" change state or otherwise generate disconnection signals for switching devices 10', 10". In actual practice, such a change in state will take place with a phase delay of approximately 120° between the channels.

A monitor in accordance with the present invention further comprises self-testing capability in the form of a self-test circuit 11 which checks for asynchronicity between processed disconnection signals delivered to relays 10', 10". If there is asynchronicity, which necessarily occurs as a result of the phase difference between the disconnection signals, a solid state switch in the self-test circuit 11 is caused to switch from the non-conductive to conductive state. The triggering of this solid state switch results in operation of the relay 3 to disconnect motor 1 from inputs U, V. The clock signals from the clock voltage generator in power supply 4 will, with the contacts of relay 3 in the open state, appear across the inputs of the redundant monitoring channels. These clock signals will result in the comparators of the evaluation circuits being driven synchronously so that they switch synchronously, i.e., produce disconnection signals, and can thus release the release lines F1–F4. Accordingly, the zero-speed monitor is, each time the motor is at a standstill, subjected to a self-test. If pulses which correspond to the clock signal do not pass through the two channels synchronously, i.e., if there is some fault in monitor 14, both of relays 10', 10" will not be operated.

A counter 12 is connected to the testing circuit 11. Counter 12 will be reset by the synchronous occurrence of disconnection signals. However, each time asynchronous disconnection signals occur, the counter 12 will be incremented. Counter 12 will also generate a fault signal after a predetermined number of asynchronous disconnect signals are received. If such a fault signal is generated, the zero-speed monitor will go to a fault state. This state can be cancelled only by switching off the supply voltage for monitor 14.

The self-test circuit 11 is expediently employed for an initial self-test before the application of power to machine 1. On such a self-test, the relay 3 will disconnect inputs U, V to monitor 14 whereupon the clock signal will be applied to these inputs. If the zero-speed monitor is operable, application of the clock signal will cause operation of the relays 10', 10" in the manner described above. Once this self-test has been carried out, and power subsequently applied to machine 1, the actual evaluation will be performed by sensing the voltage applied to the motor and, upon the opening of the contacts of switch 2, the voltage generated by the motor.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. A method for monitoring the rotational state of the rotor of a three-phase electric motor, the motor having terminals which during operation are connected to a three-phase source of alternating current, said method comprising the steps of:

detecting zero-crossings of the alternating current source voltage measured between a first and a second pair of the terminals of the motor;

generating signals commensurate with each detected zero crossing;

direct-current isolating the generated signals from the alternating current voltage to produce a pair of variable frequency control signals;

employing a first of the produced control signals to supervise the state of a first command signal transmission device connected to a first signal transmission line; and employing the second of the produced control signals to control the state of a second command signal transmission device connected to the first signal transmission line.

2. The method of claim 1 wherein said steps of employing each include:

repetitively integrating a control signal beginning from each detected zero crossing; and causing the command signed transmission devices to change state when the integrated signals exceed reference levels commensurate with a time period between successive zero-crossings indicative of a stand-still state of the rotor.

3. The method of claim 1 further comprising:

determining whether the produced control signals are in synchronization:

causing at least one of the motor terminals of each pair of terminals to be isolated from an associated zero crossing detector if the control signals are asynchronous;

applying a symmetric clock signal simultaneously to each zero-crossing detector after the motor terminals have been isolated therefrom whereby zero-crossings of the clock signal are redundantly detected; and employing control signals commensurate with the zero-crossings of the clock signal to synchronously control the command signal transmission devices.

4. The method of claim 1 further comprising:

applying a clock signal to a pair of the motor input terminals.

5. The method of claim 1 further comprising:

generating a clock signal having a frequency which exceeds the frequency of the three phase alternating current source; and utilizing the clock signal to verify the operability of the apparatus employed in control signal generation and the command signal transmission devices, the step of utilizing the clock signal including disconnecting at least one of the motor terminals of each pair from the associated zero-crossing detection apparatus and applying the clock signal simultaneously to both zero-crossing detection apparatus.

6. The method of claim 2 further comprising:

generating a clock signal having a frequency which exceeds the frequency of the three phase alternating current source; and utilizing the clock signal to verify the operability of the apparatus employed in control signal generation and the command signal transmission devices, the step of utilizing the clock signal including disconnecting at least one of the motor terminals of each pair from the associated zero-crossing detection apparatus and applying the clock signal simultaneously to both zero-crossing detection apparatus.

7. The method of claim 2 further comprising:

determining whether the change of state of the command signal transmission devices will occur in synchronization:

causing one of the motor terminals of each pair of terminals to be isolated from an associated zero crossing detector if the change in state will be asynchronous;

applying a clock signal simultaneously to each zero-crossing detector after the motor terminals have been isolated therefrom whereby zero-crossings of the clock signal are redundantly detected; and employing control signals commensurate with the zero-crossings of the clock signal to synchronously control the command signal transmission devices.

8. The method of claim 5 further comprising:

determining whether the change of state of the command signal transmission devices will occur in synchronization:

causing one of the motor terminals of each pair of terminals to be isolated from an associated zero crossing detector if the change in state will be asynchronous;

applying the clock signal simultaneously to each zero-crossing detector after the motor terminals have been isolated therefrom whereby zero-crossings of the clock signal are redundantly detected; and employing control signals commensurate with the zero-crossings of the clock signal to synchronously control the command signal transmission devices.

9. The method of claim 6 further comprising:

determining whether the change of state of the command signal transmission devices will occur in synchronization:

causing one of the motor terminals of each pair of terminals to be isolated from an associated zero crossing detector if the change in state will be asynchronous;

applying the clock signal simultaneously to each zero-crossing detector after the motor terminals have been isolated therefrom whereby zero-crossings of the clock signal are redundantly detected; and employing control signals commensurate with the zero-crossings of the clock signal to synchronously control the command signal transmission devices.

10. A zero-speed monitor for a three-phase electric motor, the motor having terminals which are connected to a three phase alternating current supply via the contacts of a switch to cause motor operation, the rotational condition of the motor being determined by the monitor when the contacts of the switch are opened, said monitor comprising:

first and second command signal generators for producing output signals commensurate with a desired state of a safety device to be controlled;

first and second zero-crossing detectors for respectively producing direct current voltage levels commensurate with each zero-crossing of a monitored alternating current voltage whereby said detectors generate pulse trains;

means connecting the inputs of each of said zero-crossing detectors to terminals of the motor whereby AC voltages commensurate with the voltage appearing at said motor terminals will be delivered as inputs to each of said detectors for monitoring;

first and second evaluation circuits for providing control signals to respective of said command signal generators; and means for coupling said detector generated pulse trains to said evaluation circuits, said coupling means isolating said pulse trains from the monitored AC voltages.

11. The monitor of claim 10 wherein said evaluation circuits each are responsive to the time between successive detected zero crossings of the monitored AC voltage.

12. The monitor of claim 10 wherein said evaluation circuits each comprise:

an integrator, the isolated pulse trains being applied to said integrators whereby the integrators provide voltages having a magnitude which varies as a function of the time between detected zero crossings; and means for comparing the magnitude of the integrator output voltages with a reference voltage level and generating a command signal generator control signal in response to the integrator output exceeding the reference level.

13. The monitor of claim 12 wherein said command signal generators are mutually interlocked.

14. The monitor of claim 13 wherein said command signal generators each comprise:

a switching device having at least a pair of contacts, the contacts of said switching devices being connected in series.

15. The monitor of claim 10 further comprising:

means for self-testing the operability of said monitor, said self-testing means including:

a signal generator for generating a periodic clock signal;

normally closed switch means for selectively interrupting the connection between the inputs of each of said detectors and a terminal of said motor;

means for determining whether the control signals for said command signal generators are asynchronous and generating an operating signal for said switch means upon the sensing of asynchronous control signals whereby said switch means will be switched to the open state and said detectors will be disconnected from said motor terminals; and means for connecting said clock signal generator simultaneously to the inputs of said zero-crossing detectors, whereby said clock signals will be processed when said switch means is in the open condition.

16. The monitor of claim 15 wherein said self-test means further comprises a counter which produces a fault signal in the event of asynchronicity of a predetermined number of pulses commensurate with said clock signal to each of said evaluation circuits.

17. The monitor of claim 10 further comprising a pulse shaping circuit connected between each of said zero-crossing detectors and a said evaluation circuit.

18. The monitor of claim 17 wherein said pulse shaping circuits are of complementary construction whereby said evaluation circuits receive pulses of opposite polarity.

19. The monitor of claim 10 wherein said pulse trains are DC isolated from the inputs to said detectors by optocouplers.

20. The monitor of claim 19 wherein current passes through said optocouplers when there are no pulses commensurate with detected zero crossings.

* * * * *

UNITED STATES PATENT AND TRADEMARK OFFICE
CERTIFICATE OF CORRECTION

PATENT NO.   : 6,049,284
DATED        : April 11, 2000
INVENTOR(S)  : Heuer

It is certified that error appears in the above-identified patent and that said Letters Patent is hereby corrected as shown below:

Column 5,
Line 29, after "motor" insert -- which has been disconnected from its power supply --.
Line 33, after "current" delete "source".
Line 34, after "voltage" insert -- generated by the motor, the zero-crossings being --.

Signed and Sealed this

Eighth Day of October, 2002

Attest:

JAMES E. ROGAN
Attesting Officer   Director of the United States Patent and Trademark Office